(12) United States Patent
Zaheer et al.

(10) Patent No.: US 11,170,408 B2
(45) Date of Patent: Nov. 9, 2021

(54) GEOFENCED SELECTION WITH TARGETED INTERACTION

(71) Applicant: NCR Corporation, Duluth, GA (US)

(72) Inventors: Abdul Khaliq Zaheer, Atlanta, GA (US); Samwimbila Malibuye Nanagila Akpan, Sandy Springs, GA (US); Curtis Patrick Quinn Evans, Smyrna, GA (US)

(73) Assignee: NCR Corporation, Atlanta, GA (US)

( * ) Notice: Subject to any disclaimer, the term of this patent is extended or adjusted under 35 U.S.C. 154(b) by 887 days.

(21) Appl. No.: 15/663,139

(22) Filed: Jul. 28, 2017

(65) Prior Publication Data

US 2019/0034966 A1    Jan. 31, 2019

(51) Int. Cl.
*G06Q 30/00* (2012.01)
*G06Q 30/02* (2012.01)

(52) U.S. Cl.
CPC ..... *G06Q 30/0261* (2013.01); *G06Q 30/0211* (2013.01); *G06Q 30/0222* (2013.01); *G06Q 30/0267* (2013.01)

(58) Field of Classification Search
CPC .......... G06Q 30/0261; G06Q 30/0211; G06Q 30/0222; G06Q 30/0267
See application file for complete search history.

(56) References Cited

U.S. PATENT DOCUMENTS

| | | | | |
|---|---|---|---|---|
| 8,909,248 B2* | 12/2014 | Phillips | ................. | H04W 4/021 |
| | | | | 455/456.1 |
| 8,972,357 B2* | 3/2015 | Shim | ..................... | G06F 16/245 |
| | | | | 707/690 |
| 9,113,298 B2* | 8/2015 | Qiu | ........................ | H04W 4/021 |
| 9,338,622 B2* | 5/2016 | Bjontegard | ............. | H04L 67/22 |
| 9,373,123 B2* | 6/2016 | Carlson | ................. | G06Q 30/02 |
| 9,727,622 B2* | 8/2017 | Kara | ........................ | G06F 16/26 |
| 10,204,137 B2* | 2/2019 | Shim | ...................... | G06F 16/29 |
| 10,423,983 B2* | 9/2019 | Shim | ..................... | H04W 4/029 |
| 2009/0132347 A1* | 5/2009 | Anderson | .............. | G06Q 30/02 |
| | | | | 705/14.52 |
| 2015/0019374 A1* | 1/2015 | Robinson | ............... | G06Q 10/04 |
| | | | | 705/26.7 |
| 2016/0048869 A1* | 2/2016 | Shim | .................. | G06Q 30/0246 |
| | | | | 705/14.45 |
| 2016/0150367 A1* | 5/2016 | Anand | ............... | G06Q 30/0261 |
| | | | | 455/456.3 |
| 2017/0243246 A1* | 8/2017 | Rodriguez | ......... | G06Q 30/0251 |

\* cited by examiner

*Primary Examiner* — Azam A Ansari
*Assistant Examiner* — Michael I Ezewoko
(74) *Attorney, Agent, or Firm* — Schwegman, Lundberg & Woessner

(57) ABSTRACT

An interface is processed for dynamically rendering an interactive geographical map. Custom-defined geographical boundaries are defined within the map. Customers currently geolocated within the geographical boundaries are identified. A custom-defined promotion is dynamically sent to devices operated by the customers and located within the geographical boundaries.

18 Claims, 6 Drawing Sheets

GEOFENCED SELECTION WITH TARGETED INTERACTION

BACKGROUND

When businesses attempt to promote their goods or services to their customers, the ability to timely provide offers that are likely to be utilized by the customers is a difficult exercise. Businesses still do not fully understand how geospatial factors affect customer acceptance of offers.

Furthermore, when a new business opens that business usually wants to be embraced by the local neighborhood but reaching out to the neighbors is typically done through signage, physical mailings, emails, and offers placed: in local publications, on websites, and/or physically handed out. Each conventional technique fails to address the physical location of the customers when the offers are presented to the customers.

Essentially, the conventional mechanisms deployed to reach the customers are done without knowledge of the customers' current locations and without knowledge as to whether those customers are enthusiastic or even going to be receptive to the new business and its goods or services.

SUMMARY

In various embodiments, methods and a system for geofenced selection and targeted interaction are presented.

According to an embodiment, a method for geofenced selection and targeted interaction is presented. More particularly, geolocations of devices are identified within geofenced boundaries. A custom-defined promotion is dynamically pushed to the devices while the devices remain within the geofenced boundaries.

DETAILED DESCRIPTION

Figure 1A:
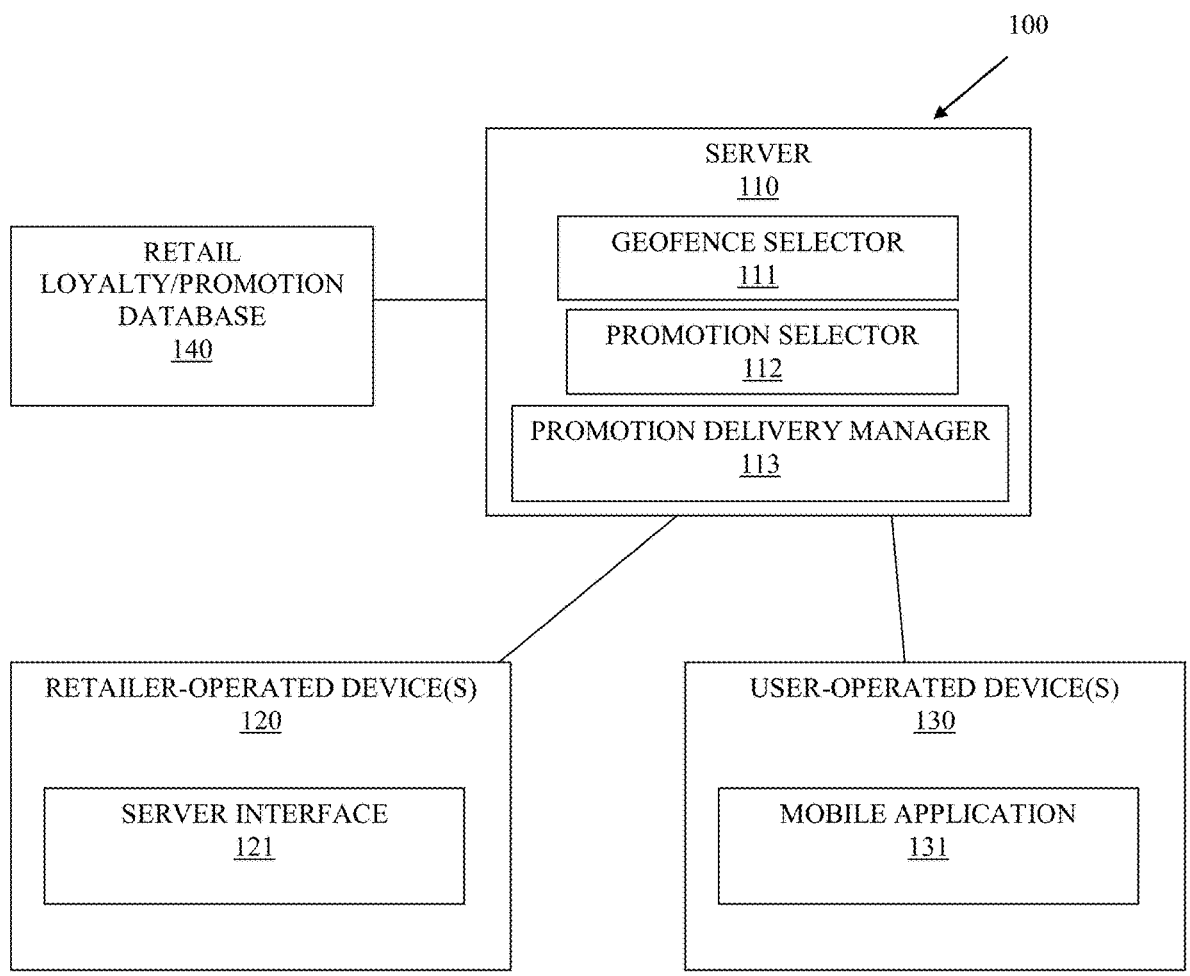
FIG. 1A is a diagram of a system for geofenced selection and targeted interaction, according to an example embodiment.

FIG. 1A is a diagram of a system 100 for geofenced selection and targeted interaction, according to an example embodiment. The various components are illustrated and the arrangement of the components is presented for purposes of illustration only. It is to be noted that other arrangements with more or less components are possible without departing from the geofenced selection and targeted interaction teachings presented herein and below.

The techniques, methods, and system presented herein and below for geofenced selection and targeted interaction can be implemented in whole or in part in one, all, or some combination of the components shown with the system 100. The techniques and methods are programmed as executable instructions in memory and/or non-transitory computer-readable storage media and processed on one or more processors associated with the various components.

As used herein the terms "customer," "consumer," and "user" may be used synonymously and interchangeably.

The term "geolocation" is a geographic location (position) or a geographical estimation of a physical location for a device being operated by or known to be in the possession of a user, at any given point in time.

The geolocation can be identified in a variety of known manners, such as through location services available on a user-operated device through Global Positioning Satellites (GPS), Wi-Fi, beacons, etc.

The term "geofence" refers to a plurality of geolocations defining a geographical boundary.

The terms "promotion," "offer," and "discount" may be used synonymously and interchangeably herein, and referring to one or more retailer-imposed conditions for a customer to receive a benefit from a retailer with respect to a good (product) or a service provided by the retailer.

The system 100 includes a server 110 having a geofence selector 111, a promotion selector 112, and a promotion delivery manager 113. The system also includes a retailor-operated device(s) 120 having a server interface 121, and a user-operated device 130 having a mobile application 131. Finally, the system includes a retail loyalty/promotion database 140. Each of these components and their interactions with one another are now discussed with reference to the FIG. 1A.

The geofence selector 111 interacts over a network connection (wireless, wired, or a combination of wired and wireless) with both the retail loyalty promotion database 140 of a retailer and the retailer-operated device(s) through the server interface 121. The promotion selector 112 interacts with both the retail loyalty promotion database 140 and the server interface 121. The promotion delivery manager 113 interacts with the server interface 121 and the mobile application 131 of the user-operated device 130.

A retailer operated the device 120 for accessing the server interface 121. The server interface 121 can be hosted on the server 110 and rendered to the device 120 such as through a browser and web pages presented within the browser on device 120. At startup, the retailer can select or provide input to the server interface 121 defining a target retail store (by name, address, and/or zip code) of the retailer and an interactive map displaying cartographic data is rendered within the interface 121. The interactive map can be zoom and pan out to a level of detail and a size of a physical area as defined by the retailer. The geofence selector 111 also accesses the retail loyalty/promotion database to obtain location history information for customers of the retailer. The geolocations of the customers for the retailer are maintained as longitude and latitude coordinates. The geolocations are reported at predefined intervals from the mobile application 131 on the user/customer-operated devices 131 (using location-based services provided with the devices 131).

The mobile application 131 also provides with the geolocations, a date and time for each sent geolocation, and a device identifier for the device 130 sending the geolocations. Each unique device identifier mapped within the retail loyalty/promotion database 140 to a specific customer identifier for a specific customer of the retailer. The customer identifiers providing linkages within the retail/loyalty promotion database 140 to customer information, such as name, demographics, customer segmentation, promotions sent, promotions accepted, loyalty level, transaction history, customer profile or preferences (preferred delivery of promotions over, email, Short Message Service (SMS) text, voice call, etc.), and the like.

Once a retailer has interacted with the cartographic interactive map through the server interface 121 to define a level of detail (through zooming, panning, etc.), the geofence selector 111 calculates the geographic boundaries (north, south, east, and west) defined by the retailer-defined view created by the retailer through the server interface 121 using the server interface. Next, the geofence selector 111 searches the location history of the retail loyalty promotion database 140 for customers of the retailer that have current locations (as reported by their mobile applications 131) within or on the geographic boundaries. This provides a set of customer identifiers for customers that are currently (at the time that the retailer defined the level of map detail) because the mobile device identifiers are mapped to customer identifiers within the database 140. The customer records for each customer is also now accessible to the geofence selector 111.

The geofence selector 111 then superimposes on the cartographic map data presented by the initial geographical boundaries a pin image, where each pin image identifies a current location for a particular customer of the retailer. An example illustration of this is presented in the FIG. 1B

The retailer then selects an option within the server interface 121 to custom-defined a sub-region within the map using a graphical drawing/selection tool provided with the interactive map. This permits the retailer to define sub-geographical boundaries within the geographical boundaries provided in the current level of detail for the map. In an embodiment, the drawing/selection tool may permit the retailer to define a north point, a south point, an east point, and a west point (4 points) and the server interfaces highlights the polygon created when the 4 points are connected. In an embodiment, the drawing/selection tool may permit the retailer to click and hold on an initial point on the map and drag to final point on the map where the click is released, and the server interface 121 highlights the area defined through the click and hold, drag, and release. In an embodiment, the drawing/selection tool may permit the retailer to draw any shape, such as a square, a circle, an oval, a rectangle, etc.

Figure 1B:
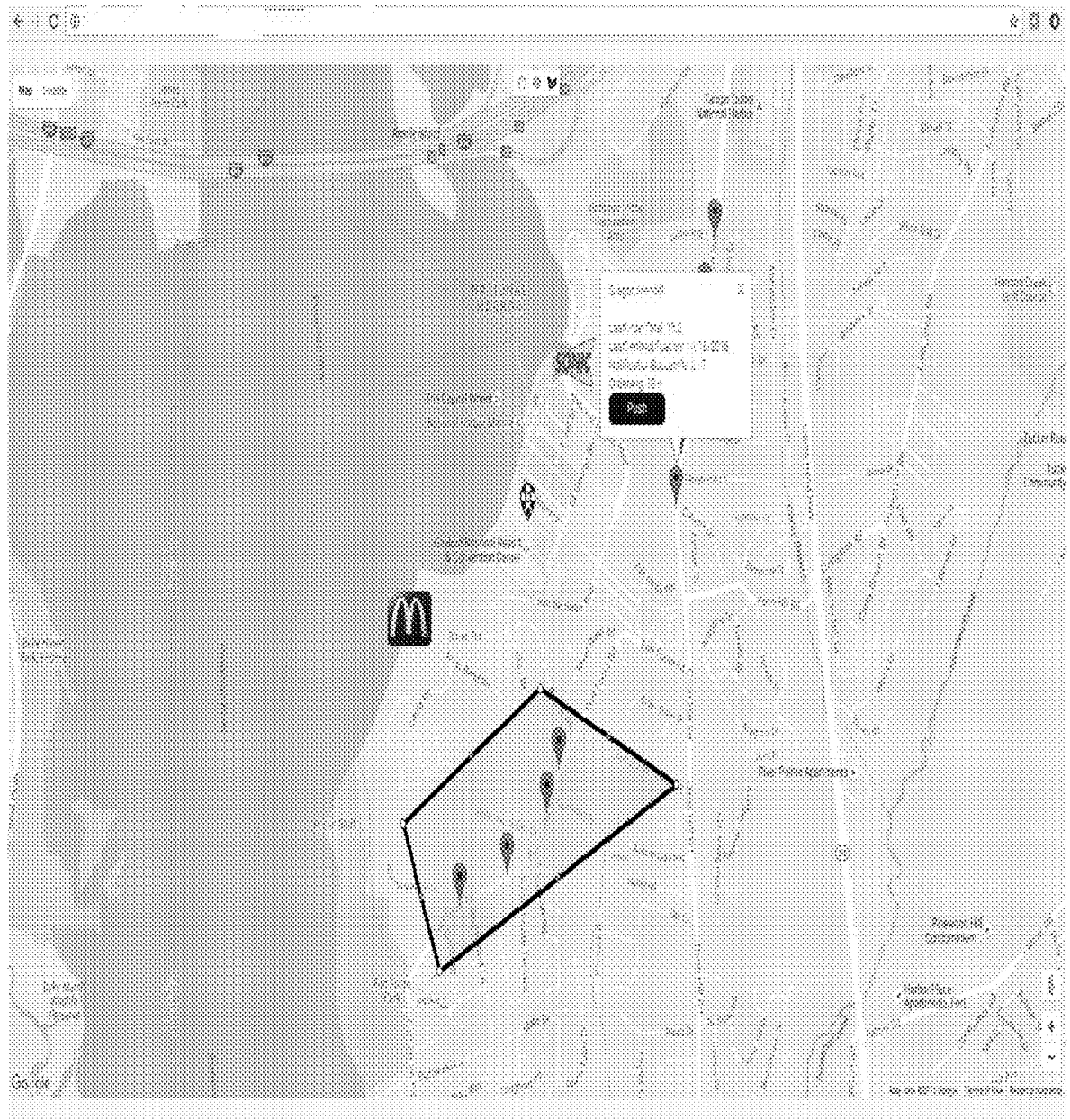
FIG. 1B is an example screenshot for a retailor interface, according to an example embodiment.

The FIG. 1B illustrates and example screen shot defined interactively and ad-hoc by a retailer through the server interface 121 for purposes of defining a map level of detail (initial view geographical bounding that includes at least one retailer store) and a retailer-defined sub-region (sub-geographical boundary) that is highlighted and drawn as the polygon in the FIG. 1B.

The ad-hoc and retailer-controlled/defined sub-geographical boundaries include all customers for the retailer that are presently located within or on the sub-geographical boundaries. The retailer can visualize, in real time, a total number and specific customers present within the retailer defined sub-geographical boundaries through the interactive map of the interface 121.

In an embodiment, the server interface 121 provides canned filtering options for the retailer to remove some identified customers from the map and/or sub-geographical boundaries. The server interface 121 may also allow the retailer to create his/her own custom-defined filter to remove some of the identified customers from the map and/or sub-geographical boundaries. For example, the retail may restrict customer pins that are presented within the map and/or sub-geographical boundaries to: customers of a defined demographic, customers having a transaction with the retailer within a predefined time period, customers having a specified loyalty level, customers of a specified gender, customers of a specified age, etc.

For each customer, identified by a graphical image (such as the pin image shown in the FIG. 1B), the retailer may mouse over each image and the geofence selector 111 presents summary information about the customer associated with that image. In an embodiment, the summary information includes the selected customer's last order total amount, the last sent notification (promotion) to the customer, and a current calculated success rate for promotions with the customer. An example of this is illustrated as the pop up window presented in the FIG. 1B.

Optionally, as shown in the FIG. 1B the pop up also includes a push button that when activated by the retailer sends a promotion directly to the customer (delivery of the promotion discussed in more detail below). In an embodiment, another button may permit direct access through the geofence selector 111 to the entire customer's records housed in the database 140 for the customer.

The server interface 121 may further provide options for the retailer to select all customers identified within the sub-geographical boundaries that remain after any retailer-applied filters or to select specific customers within the sub-geographical boundaries that remain after any retailer-applied filters.

Prior to selecting customers for promotion delivery (as discussed above) or before the processing for custom-selecting the customers, the retailer may access the server interface 121 for defining a promotion that is to be offered to selected customers (based on the geofenced boundaries). The server interface 121 interacts with the promotion selector 112 for this processing. An example, promotion selection is presented in the screenshot of the FIG. 1C where the server interface 121 allows the retailer to select a particular promotion being offered by the retailer. The promotion selector 112 access the database 140 to obtain active promotions for selection by the retailer through the server interface 121. In an embodiment, the server interface 121 also allows the retailer to custom define a new promotion. In an embodiment, the customers selected for promotion based on the retailer-defined sub-geographical boundaries are also presented within the screen for individual selection or selection of all such customers to receive the retailer-determined promotion (this is also shown in the screen shot of the FIG. 1C).

Figure 1C:
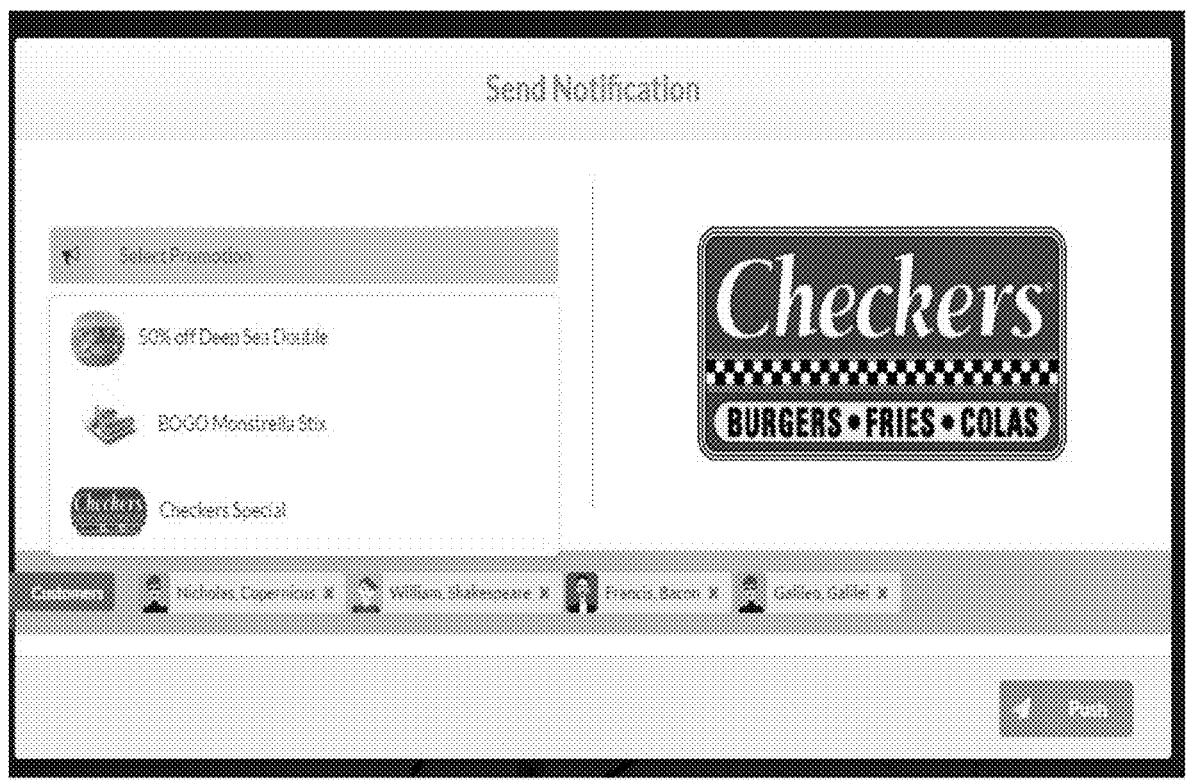
FIG. 1C is another example screenshot for the retailer interface, according to an example embodiment.

Once the promotion and the customers are selected based on their geolocations, the promotion delivery manager 113 is activated. Activation or the promotion delivery manager can be made through the map creation portion of the server interface 121 (FIG. 1B through the popup push button) and/or through the promotion selection portion of the server interface 121 (FIG. 1C push bottom right of the screenshot).

The promotion delivery manager 113 packages the promotion in a format that can be automatically redeemed by the customer through the mobile application 131 (herein after "app 131"), a SMS text, and/or an email. In an embodiment, the delivered promotion is provided to the device 130 by the promotion delivery manager 113 as a barcode or Quick Response (QR) code that can be scanned at the retail store for redemption at a Point-Of-Sale (POS) terminal (which can be a customer-operated device such as a Self-Service Terminal (SST)). In an embodiment, the customer can add items to the promotion through the app 131 once received such that a customer-defined order with the promotion added can be redeemed together and automatically at the retail store. In an embodiment, the customer can order customer-defined items, redeem the promotion, and pay for order through the app 131, such that the customer need only visit the retail store for pickup or await delivery of the order to a predefined location.

In an embodiment, the promotion delivery manager 113 provides the promotion to the devices 130 as a package of data that provides an automated mechanism for redeeming the promotion, adding or customizing an order, scheduling the order, and paying for the order. The package can be in a format that the app 131 can process or can be in an independent format that can be handled through an automated bot activated over a network-voice enabled device (Amazon® Echo®, Siri®, Google® Home®, etc.), SMS text, social media (Facebook®, Instagram®, Twitter®, Snapchat®, etc.).

In an embodiment, the server interface 121 provides an analytics interface to the retailer for obtaining pre-defined analytics about customers present in the geographical boundaries or the retailer can custom define analytics for automatic selection of the customers present within the geographical boundaries.

In an embodiment, the promotion defined or selected by the retailer can be used as a filter to automatically identify the customers present within the geographical boundaries or the sub-geographic boundaries for automatically receiving the promotion through dynamic pushes to the devices 130.

In an embodiment, a single customer may have multiple devices 130 registered with the database 140 and the promotion delivery manager 113 delivers the promotion to each of those devices. In an embodiment, the delivery to those devices are over multiple different communication channels (e.g. text, automated voice, app 131, television, social media, web posting, etc.).

In an embodiment, the retailer operates the server interface 121 and the system 100 processes to identify customers geolocated at a competitor of the retailer or near a competitor and dynamically and real time reaches the customer with a targeted promotion for enticing the customer to the retail location of the retailer.

In an embodiment, the retailer dynamically pushes a customized promotion to a specific venue (sporting event, etc.) through the server interface 121 and the system 100 processes for purposes of a retailer-based game of skill or chance or with the promotion being limited to a specific number of customers that are first to redeem the promotion.

In an embodiment, the retailer uses the interface 121 for defining an initial generic promotion that the delivery manager 113 pushes to a specific geographically located device within the geographical or sub-geographical boundaries, wherein the device is a digital sign located at the venue. In an embodiment, the promotion is for potential customers of the venue to sign up as a registered customer with the retailer to receive a second retailer defined promotion that is provided with the generic promotion.

In an embodiment, the retailer uses the interface 121 to discover in real-time customers of the retailers current at a competitors establishment, such as a casino. The retailer then interfaces with 111-113 to dynamically push in real-time a promotion to entice the customer to leave that establishment and come to the establishment of the retailer. This is particular beneficial with high-value casino customers (often referred to as "whales") that spend large sums of money gaming. The retailer may entice the gambler to leave a competitor's casino and come to the retailer's casino with a promotion offering free game play or a promotional gift being offered that day.

In an embodiment, a promotion can be defined through interface 121 that is pushed to customers when they are detected as entering a specific retailer store on a given day and/or time of day. The geofence selector 111 can cooperate with beacons located within the store to specifically identify the customer as having entered the store. The promotion can be provided based on a variety of other retailer-defined conditions provided through the interface 121 to the promotion selector 112, such as, but not limited to: a promotion of the day at the store, the customer's purchase history, and retailer-specific events defined by the retailer.

In an embodiment, the interface 121 is processed with 111-113 for defining and delivering a promotion to customers that are detected in a parking lot (mall, hotel, stadium, etc.), which is within the geofenced boundaries of a store for the retailer. A store can include a restaurant or grocery store. This can be used to lure the customer to a convenient nearby store of the retailer. It may also include time-based constraints, such as at the end or near the end of a sporting event when customers are or are about to leave the sporting event for another destination, such as their homes.

In an embodiment, the retailer is a delivery business such as GrubHub®, UberEats®, etc. The retailer uses the interface 121 with 111-113 to define either a promotion or a notification that is dynamically sent through 113 to the customer's operated device when the customer is in predefined geographical boundaries (geofenced area) where the services of these delivery businesses are available for accessing and the notification provides food establishment choices to the customer. For example, the notification pushed by 113 to the device 130 may state: "you are in an area where we (delivery business) have 100% coverage right now . . . here are your food options: Hardee's®, McDonalds®, Panera Bread®, etc. . . . would you like to order some food for lunch?"

In fact, a variety of scenarios can exist beyond what has been discussed above. It is to be noted that in some cases a promotion can include a notification message as discussed above in the previous embodiment.

In an embodiment, the device 130 is one of: a phone, a tablet, a wearable processing device, automated voice-enabled network device, a television, a computer-enabled device integrated into a transportation vehicle, a desktop computer, a laptop computer, and a processor-enabled appliance that is part of the Internet-of-Things (IoTs).

In an embodiment, the device 120 is one of: a phone, a tablet, a wearable processing device, a desktop computer, and a laptop computer.

In an embodiment, the server 110 is part of a cloud processing environment accessible and hooked into external databases 140, each database 140 associated with a different retailer.

In an embodiment, the server 110 is integrated into a specific retailer computing environment.

In an embodiment, the interface 111 is provided as a Software-as-a-Service through an online and web-based portal that renders the server interface 121 on the device 120.

In an embodiment, the interface permits time-based filtering on the sub-geographical boundaries, such that the retailer can indicate that the promotion is to be provided to any customer that is detected as entering the sub-geographical boundaries within a given period of time. This permits unidentified customers that enter the sub-geographical boundaries (geographical zone) to receive the promotion from the delivery manager 113 based on real-time and changing customer identifiers processed by the geofence selector 111 from the database 140 using the location history and geolocations being dynamically reported by the apps 131 of such customers' devices 130.

In an embodiment, the device 130 is a stationary device such as a television that has a known geolocation provided during registration or obtained during registration of a customer with the database 140. In such a situation, the location history for such device 130 is static or static until such time as the owning customer moves it to a new geolocation.

In an embodiment, the promotion selector 112 includes an Application Programming Interface (API) that can be queried by external services, such as an automated voice networked-enabled device for discovering retailer-provided ad-hock promotions along with the geographical constraints and any time constraints. This permits those automated voice devices to audibly provide customers with the promotions and geographical constraints placed on those promotions, such that when the customers enter the geographical zone of the promotion within any period of time constraint, a customer device 130 automatically receives the promotion from the promotion delivery manager 113.

In an embodiment, the promotion delivery manager 113 tracks the geolocations of the devices 130 after the promotion is delivered to the devices 130 using the location history of the database 140 and a unique promotion identifier assigned to the promotion.

In an embodiment, the system 100 retains metrics for promotions with respect to the customers and the server interface 121 includes an analytics engine for dynamically generating customized reports and analytics from those metrics.

These embodiments and other embodiments are now discussed with reference to the FIGS. 2-4.

Figure 2:
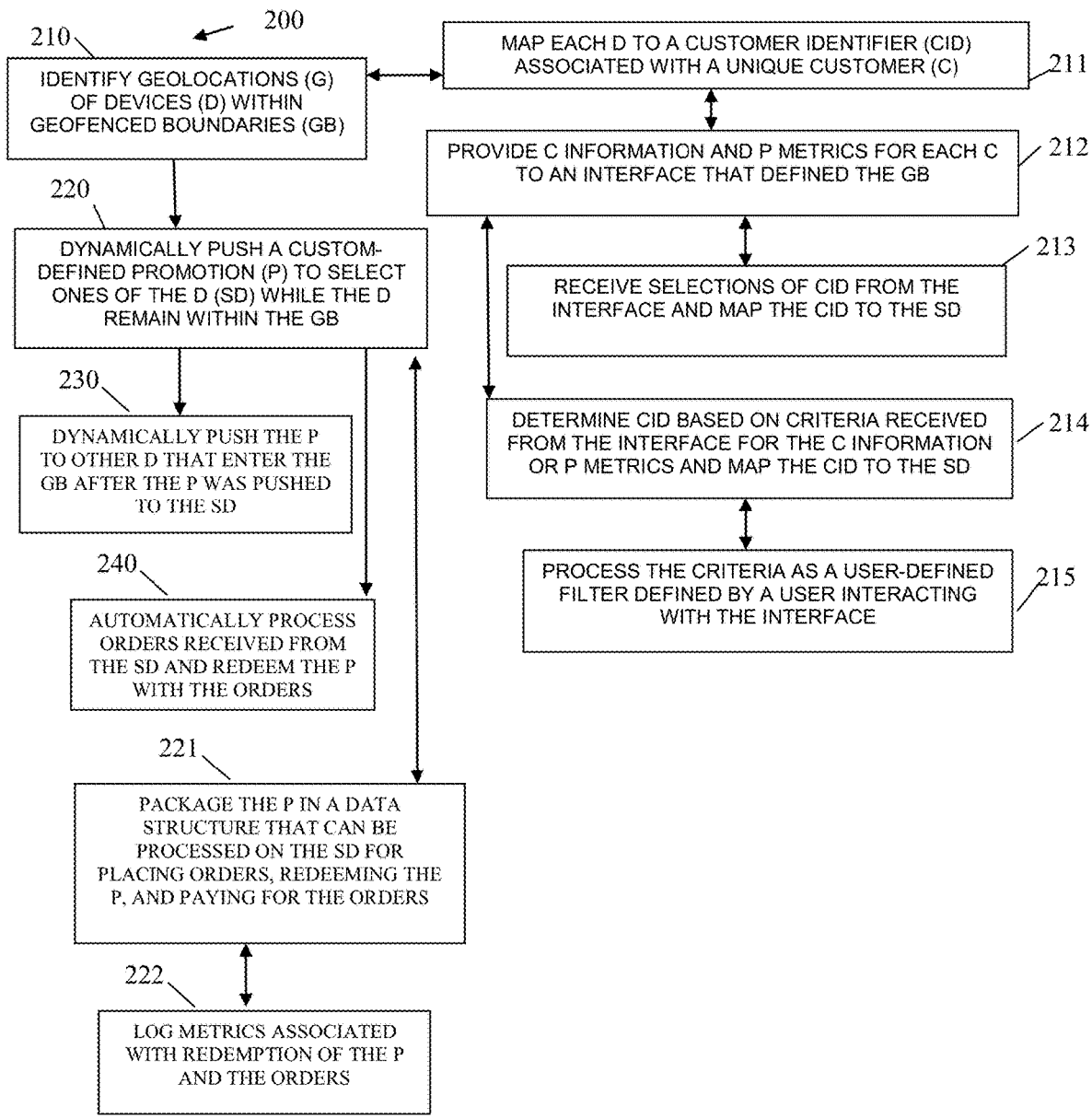
FIG. 2 is a diagram of a method for geofenced selection and targeted interaction, according to an example embodiment.

FIG. 2 is a diagram of a method 200 for geofenced selection and targeted interaction, according to an example embodiment. The software module(s) that implements the method 200 is referred to as a "geofenced targeted interaction manager." The geofenced targeted interaction manager is implemented as executable instructions programmed and residing within memory and/or a non-transitory computer-readable (processor-readable) storage medium and executed by one or more processors of a device. The processor(s) of the device that executes the geofenced targeted interaction manager are specifically configured and programmed to process the geofenced targeted interaction manager. The geofenced targeted interaction manager has access to one or more networks during its processing. The networks can be wired, wireless, or a combination of wired and wireless.

In an embodiment, the geofenced targeted interaction manager is all of or some combination of the geofence selector 111, the promotion selector 112, and/or the promotion delivery manager 113.

In an embodiment, the device that executes the geofenced targeted interaction manager is the server 110.

In an embodiment, the device that executes the geofenced targeted interaction manager is a plurality of servers logically organized as a cloud processing environment.

At 210, the geofenced targeted interaction manager identifies geolocations of reporting devices as being within geofenced boundaries. In an embodiment, the geofenced boundaries are supplied by the server interface 121 as defined by a retailer (user).

In an embodiment, at 211, the geofenced targeted interaction manager maps each device (through a device identifier) to a customer identifier associated with a unique customer. In an embodiment, the geofenced targeted interaction manager obtains the geolocations and the customer identifiers from database 140.

In an embodiment of 211 and at 212, the geofenced targeted interaction manager provides customer information and promotion metrics for each customer to an interface that defined the geographical boundaries. Again, the interface is server interface 121 and/or the method 300 discussed below.

In an embodiment of 212 and at 213, the geofenced targeted interaction manager receives selections of the customer identifiers from the interface and maps the customer identifiers to select ones of the devices (discussed at 220).

In an embodiment of 212 and at 214, the geofenced targeted interaction manager determines the customer identifiers based on criteria received from the interface for the customer information and/or the promotion metrics. The geofenced targeted interaction manager maps the determined customer identifiers to the select ones of the devices.

In an embodiment of 214 and at 215, the geofenced targeted interaction manager processes the criteria as a user-defined filter defined by a user (retailer) interacting with the interface.

At 220, the geofenced targeted interaction manager dynamically pushes a custom-defined promotion to select ones of the devices while the devices remain or are in the geographical boundaries.

In an embodiment, at 221, the geofenced targeted interaction manager packages the promotion in a data structure that can be processed on the select ones of the devices for placing orders, redeeming the promotion, and paying for the orders.

In an embodiment of 221 and at 222, the geofenced targeted interaction manager logs metrics associated with redemption of the promotion and the orders for subsequent reporting and analytics regarding the success or failure of the promotion with the customers that received the promotion.

According to an embodiment, at 230, the geofenced targeted interaction manager dynamically pushes the promotion to other devices that enter the geographical boundaries after the promotion was pushed to the select ones of the devices. This can also include a user-defined criteria relevant to a time period, such that the other devices are pushed the promotion if they enter the geographical boundaries and are within the time period.

In an embodiment, at 240, the geofenced targeted interaction manager automatically processes orders received from the select ones of the devices and redeems the promotion with the orders.

Figure 3:
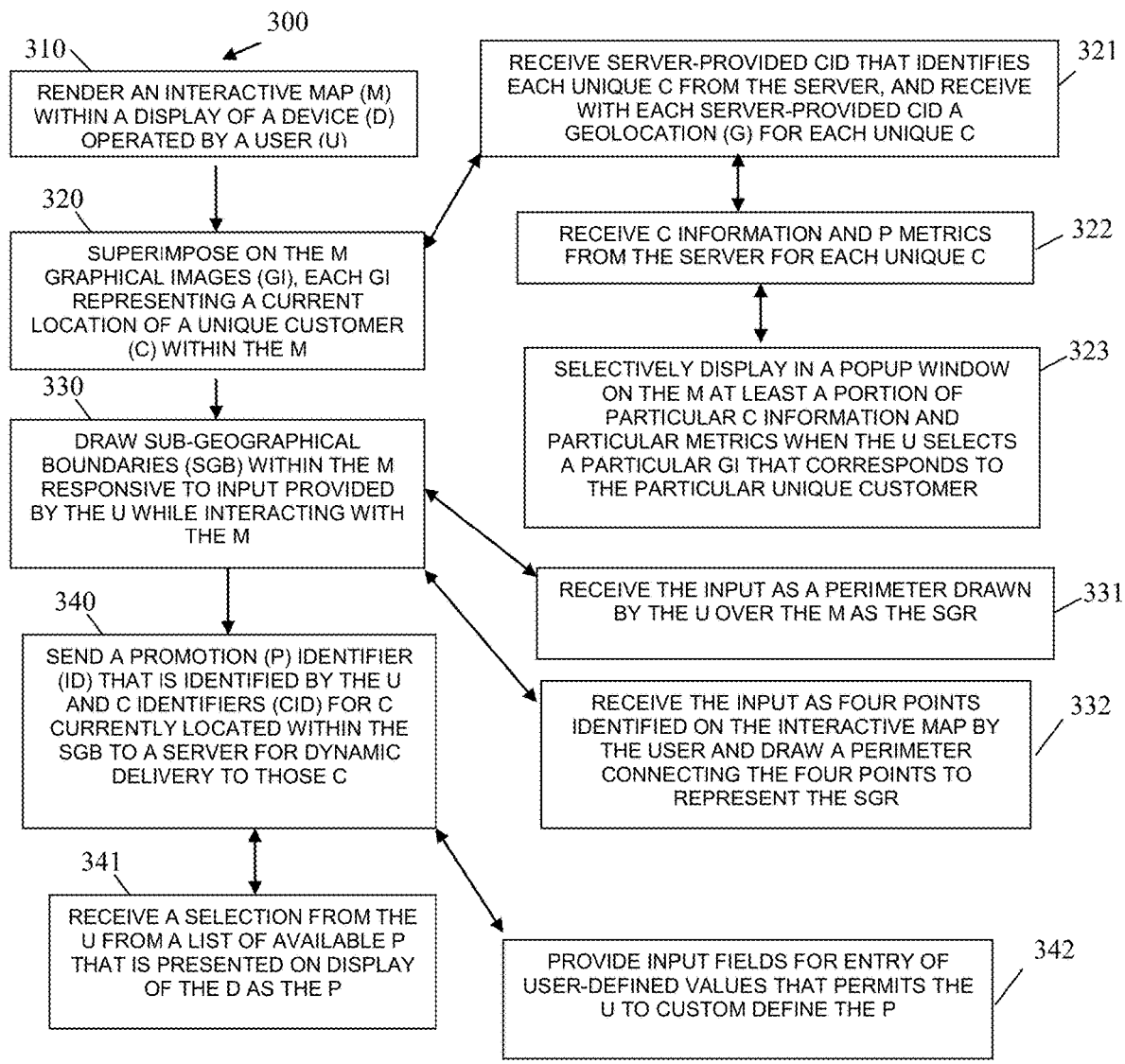
FIG. 3 is a diagram of another method for geofenced selection and targeted interaction, according to an example embodiment.

FIG. 3 is a diagram of another method 300 for geofenced selection and targeted interaction, according to an example embodiment. The software module(s) that implement the method 300 is referred to herein as a "geofenced targeted promotion interface." The geofenced targeted promotion interface is implemented as executable instructions and programmed within memory and/or a non-transitory computer-readable (processor-readable) storage medium that executes on one or more processors of a device. The processors of the device are specifically configured to execute the geofenced targeted promotion interface. The geofenced targeted promotion interface has access one or more networks; the networks can be wired, wireless, or a combination of wired and wireless.

The processing described herein for the geofenced targeted promotion interface interacts the method 200.

In an embodiment, the geofenced targeted promotion interface is the server interface 121.

In an embodiment, the device that executes the geofenced targeted promotion interface is the device 120.

In an embodiment, the device that executes the mobile app is one of: a phone, a tablet, a wearable processing device, a desktop computer, and a laptop computer.

At 310, the geofenced targeted promotion interface renders an interactive map within a display of a device operated by a user (retailer).

At 320, the geofenced targeted promotion interface superimposes on the map distinctive graphical images (such as a colored pin image). Each graphical image representing a current location of a unique customer within the context of the map and its geographical boundaries.

In an embodiment, at 321, the geofenced targeted promotion interface receives server-provided customer identifiers that identifies each unique customer from the server. Each server-provided customer identifier includes a current geolocation for each unique customer within the context of the geographical boundaries defined for the map.

In an embodiment of 321 and at 322, the geofenced targeted promotion interface receives customer information and promotion metrics from the server for each unique customer linked to the customer identifier.

In an embodiment of 322 and at 323, the geofenced targeted promotion interface selectively displays in a popup window on the map at least a portion of particular customer information and particular promotion metrics when the user selects or brings into focus a particular graphical image that corresponds to the particular unique customer.

At 330, the geofenced targeted promotion interface draws sub-geographical boundaries within the map responsive to input provided by the user while the user interacts with the map on the display of the device.

According to an embodiment, at 331, the geofenced targeted promotion interface receives the input as a perimeter shape that is drawn by the user over the ma as the sub-geographical boundaries.

In an embodiment, at 332, the geofenced targeted promotion interface receives the input as four points identified on the map by the user. In response, the geofenced targeted promotion interface draws a perimeter that connects the four points as a shape that defines and represents the sub-geographical boundaries.

At 340, the geofenced targeted promotion interface sends a promotion identifier for a promotion that is identified by the user and customer identifiers for customers that are currently located within the sub-geographical boundaries to the server for dynamic delivery in real time to those customers. The server is server 110 discussed above with the FIGS. 1A-1B and/or the processing located on the server that processes the method 200.

In an embodiment, at 341, the geofenced targeted promotion interface receives a selection from the user from a list of available promotions that is presented on the display of the device as the promotion.

In an embodiment, at 342, the geofenced targeted promotion interface provides input fields for entry of user-defined values that permits the user to custom define the promotion.

Figure 4:
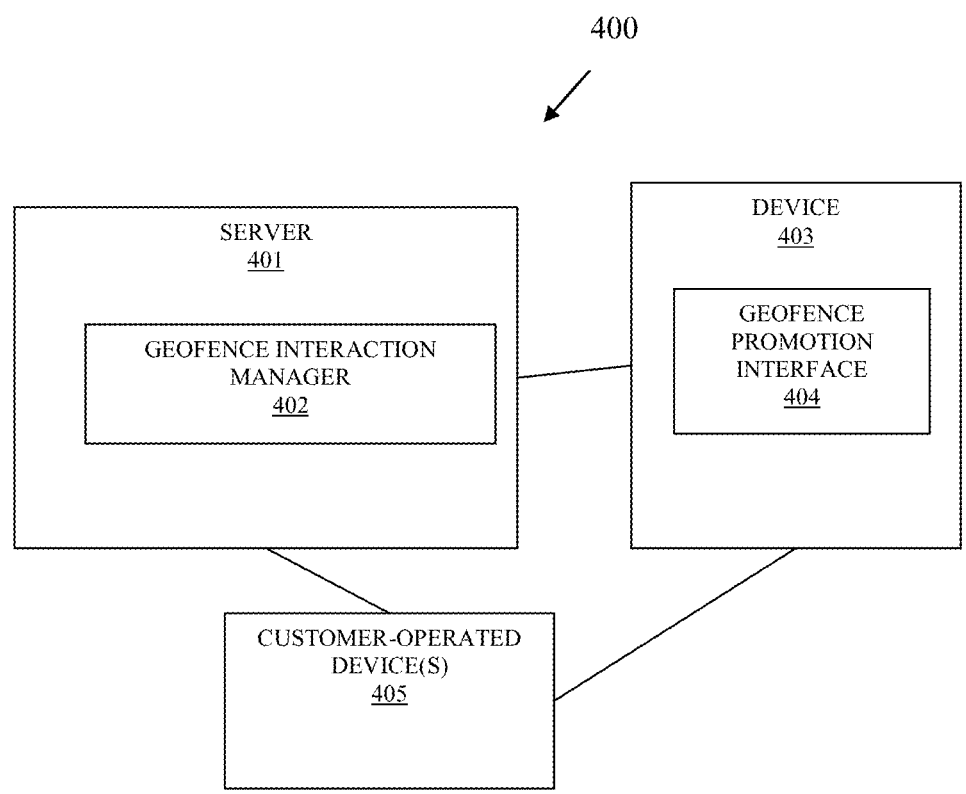
FIG. 4 is a diagram of another system for geofenced selection and targeted interaction, according to an example embodiment.

FIG. 4 is a diagram of a system 400 for geofenced selection and targeted interaction, according to an example embodiment. The components of the system 400 are programmed and reside within memory and/or a non-transitory computer-readable medium and execute on one or more processors of the devices of the system 400. The system 400 also has access and can communicate over one or more networks; and the networks can be wired, wireless, or a combination of wired and wireless.

The system 400 is configured and programmed to perform the processing discussed above with the FIGS. 1A-1C and 2-3.

The system 400 includes a server 401 having a geofence interaction manager 402, and the system 400 includes a device 403 having a geofence promotion interface 404. The system 400 also interacts with one or more second devices 405 operated by customers.

In an embodiment, the server is the server 110.

In an embodiment, the server is a part of a cloud processing environment.

The geofence interaction manager 402 is configured to: i) identify current geolocations of customer-operated devices 405 within geographical boundaries, 2) provide the current geolocations with customer identifiers to the geofence promotion interface 404 and ii) dynamically push promotions to select ones of the customer-operated devices 405 provided by the geofence promotion interface 404.

In an embodiment, the geofence interaction manager 402 is all or some combination of the geofence selector 111, the promotion selector 112, the promotion delivery manager 113, and/or the method 200.

The geofence promotion interface 404 is configured to: i) provide an interactive map on a display of the device 403, ii) identify customers within the interactive map based on the current geolocations with the customer identifiers, iii) define sub-geographical boundaries based on user interaction with the interactive map, iv) provide the promotion and the select ones of the customer identifiers associated with the select ones of the customer-operated devices 405 to the geofence interaction manager 402 based on the user interaction, the sub-geographical boundaries, and the geolocations with the customer identifiers.

In an embodiment, the geofence promotion interface 404 is some combination or all of the server interface 121 and the method 300.

In an embodiment, the customer-operated devices are one or more of: a phone, a wearable processing device, a laptop computer, a desktop computer, a computer-enabled device integrated into a transportation vehicle, a television, a digital sign, and a computer-enabled device that is part of the IoTs.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
providing executable instructions to a processor of a server for performing processing comprising:
   providing a server interface hosted from the server to a retail-operated device of a retailer;
   providing by the server interface an interactive map comprised of cartographic data;
   receiving from the retailer sub-regions drawn within the interactive map over the cartographic data that defines geofenced boundaries surrounding retail stores of the retailer, wherein receiving further includes zooming and panning within the cartographic data to a level of detail defined by the retailer and calculating the geographic boundaries for each sub-region drawn based on the retailer defining four points for the corresponding sub-region, the four points comprising a north point, a south point, a east point, and a west point and connecting the four points and highlighting a polygon representing the four points connected as the corresponding sub-region defined by the retailer through the interactive map;
   obtaining customer identifiers from a loyalty system of the retailer, wherein obtaining further includes searching a location history of customers for the retailer within a retail loyalty promotion database of the loyalty system and obtaining a set of the customer identifiers representing customers whose mobile devices are reporting current locations, wherein the customer identifies are mapped within the retail loyalty promotion database to mobile device identifiers for the mobile devices of the customers, wherein obtaining further includes obtaining customer records for each of the customer identifiers from the loyalty system;
   displaying the customer identifiers along with current locations for the customers associated with the customer identifiers within the cartographic data of the interactive map, wherein displaying further includes superimposing pin images on the interactive map, each pin image identifies a specific current location for a specific customer;
   identifying geolocations of select mobile devices that are detected within the geofenced boundaries, wherein identifying further includes obtaining select customer identifiers and select customer records that are linked to the corresponding mobile device identifiers associated with the select mobile devices; and
   dynamically pushing a custom-defined promotion to select ones of the select mobile devices while the select ones of the select mobile devices remain within the geofenced boundaries and based on evaluation of one or more retailer-defined conditions satisfied from information included within the select customer records, wherein the custom-defined promotion comprising the retailer-defined conditions, and wherein dynamically pushing further includes receiving the custom-defined promotion from the retailer through the server interface.

2. The method of claim 1 further comprising, dynamically pushing the custom-defined promotion to other mobile devices that enter the geofenced boundaries after the custom-defined promotion was pushed to the select ones of the select mobile devices.

3. The method of claim 1 further comprising, automatically processing orders received from the select ones of the select mobile devices and redeeming the custom-defined promotion with the orders with the loyalty system of the retailer.

4. The method of claim 1, wherein identifying further includes mapping each mobile device identifier for each mobile device to a unique customer identifier associated with a unique customer.

5. The method of claim 1, wherein dynamically pushing further includes packaging the promotion in a data structure that can be processed on the select ones of the select mobile devices for placing orders, redeeming the custom-defined promotion, and paying for the orders.

6. The method of claim 4, wherein mapping further includes providing the information and promotion metrics for each unique customer to the server interface that defined geofenced boundaries based on the corresponding customer record obtained from the retail loyalty promotion database.

7. The method of claim 6, wherein providing further includes receiving selections of the customer identifiers from the retailer operating the server interface and mapping the selections of the customer identifiers to the corresponding mobile device identifiers.

8. The method of claim 6, wherein providing further includes determining specific customer identifiers based on criteria received from the retailer through the server interface for the information or the promotion metrics and mapping the specific customer identifiers to the corresponding mobile device identifiers.

9. The method of claim 8, wherein determining further includes processing the criteria as a user-defined filter defined by the retailer interacting with the server interface.

10. The method of claim 5, wherein packaging further includes logging metrics associated with redemption of the custom-defined promotion and the orders.

11. A method, comprising:
providing executable instructions to a processor of a device for performing processing comprising:
   rendering an interactive map within a display of the device operated by a retailer, wherein the interactive map comprising cartographic data, and wherein the interactive map provided by a server interface hosted by a server;
   superimposing on the interactive map graphical images, each graphical image representing a current location of a unique customer within the cartographic data of the interactive map based on mobile device identifiers for mobile devices operated by customers, each mobile device identifier linked to a unique customer identifier and each unique customer identifier linked to a customer record housed in a loyalty system of the retailer, and superimposing other graphical images on the interactive map within the cartographic data that represents specific retail stores of the retailer;
   drawing sub-geographical boundaries around the retail stores within the cartographic data of the interactive map responsive to inputs provided by the retailer while interacting with the interactive map, wherein drawing further includes identifying the inputs as four points selected by the retailer within the interactive map, wherein the four points comprise a north point, a south point, an east point, and a west point, and wherein drawing further includes connecting the four points creating a polygon, calculating the sub-geographic boundaries from the polygon, and highlighting the polygon within the interactive map; and sending a promotion identifier for a promotion that is identified by the retailer and select customer identifiers for the corresponding customers currently located within the sub-geographical boundaries to the server for dynamic delivery of the promotion to those customer.

12. The method of claim 11, wherein superimposing further includes receiving server-provided customer identifiers that identifies each unique customer from the server and receiving with each server-provided customer identifier a geolocation for each unique customer.

13. The method of claim 11, wherein sending further includes receiving a selection from the retailer user from a list of available promotions that is presented on the display of the device as the promotion.

14. The method of claim 11, wherein sending further includes providing input fields for entry of user-defined values that permits the retailer user to custom define the promotion.

15. The method of claim 12, wherein receiving further includes receiving customer information and promotion metrics from the server for each unique customer based on the corresponding customer record associated with the corresponding customer server-provided customer identifier.

16. The method of claim 15, wherein receiving further includes selectively displaying in a popup window on the interactive map at least a portion of particular customer information and particular promotion metrics for a particular unique customer when the retailer user selects a particular graphical image that corresponds to the particular unique customer.

17. A system, comprising:
a sever comprising a server processor that executes first executable instructions as a geofence interaction manager; and
a device comprising a device processor that executes second executable instructions as a geofence promotion interface;
wherein the processor obtains the first executable instructions as geofence interaction manager causing the processor to perform first operations comprising:
presenting a cartographic data within a server interface hosted by the server, the cartographic data identifies store locations and current geolocations of customer-operated devices within geographical boundaries of the store locations;
providing the current geolocations with customer identifiers to the geofence promotion interface based on mobile device identifiers associated with the customer-operated devices that are linked to the customer identifiers within a loyalty system of a retailer, and wherein each customer identifier linked to a customer record; and
dynamically pushing promotions to select ones of the customer-operated devices provided by the geofence promotion interface based on retailer defined conditions provided by the retailer through the geofence promotion interface for the promotions that are evaluated against information comprised in the corresponding customer records; and
wherein the device obtains the second executable instructions as the geofence promotion interface causing the device processor to perform second operations comprising:
providing an interactive map comprising the cartographic data on a display of the device;
identifying customers within the interactive map based on the geolocations with the customer identifiers by superimposing graphical images for the customer identifiers within interactive map corresponding to the geolocations;
defining sub-geographical boundaries based on retailer user interaction with the interactive map with the retailer selecting four points within the interactive map, the four points comprising a north point, a south point, an east point, and a west point, wherein defining further includes connecting the four points as a polygon and calculating the sub-geographical boundaries from the polygon;
defining the retailer-defined conditions for the promotions based on retailer interaction with the geofence promotion interface;
providing the promotion, the conditions, and select ones of the customer identifiers associated with select ones of the customer-operated mobile devices to the geofence interaction manager when the mobile device identifiers corresponding to the select ones of the customer identifiers is detected based on the geolocations as being within the sub-geographical boundaries.

18. The system of claim 17, wherein the server is part of a cloud processing environment and the customer-operated devices are one or more of: a phone, a wearable processing device, a laptop computer, a desktop computer, a computer-enabled device integrated into a transportation vehicle, a television, a digital sign, and a computer-enabled device that is part of the Internet-of-Things (IoTs).

* * * * *